US010412793B2

(12) United States Patent
D'Andrea et al.

(10) Patent No.: US 10,412,793 B2
(45) Date of Patent: Sep. 10, 2019

(54) COOKING APPLIANCE

(71) Applicant: Electrolux Professional S.p.A., Pordenone (IT)

(72) Inventors: Francesco Guiseppe D'Andrea, Barbeano di Spilimbergo (IT); Loris Corai, Chions (IT)

(73) Assignee: Electrolux Professional S.p.A., Pordenone (IT)

( * ) Notice: Subject to any disclaimer, the term of this patent is extended or adjusted under 35 U.S.C. 154(b) by 448 days.

(21) Appl. No.: 15/190,246

(22) Filed: Jun. 23, 2016

(65) Prior Publication Data
US 2016/0381740 A1    Dec. 29, 2016

(30) Foreign Application Priority Data
Jun. 26, 2015  (EP) .................................... 15173972

(51) Int. Cl.
| H05B 6/64 | (2006.01) |
| A47J 36/10 | (2006.01) |
| A47J 37/06 | (2006.01) |

(52) U.S. Cl.
CPC ............ *H05B 6/6417* (2013.01); *A47J 36/10* (2013.01); *A47J 37/0611* (2013.01); *H05B 6/647* (2013.01)

(58) Field of Classification Search
CPC ......... A47J 36/10; A47J 37/0611; A47J 27/62
USPC .......... 219/401, 521, 525, 685; 99/331–333, 99/342, 344, 349, 353, 372, 375, 400, 99/401, 425, 444–450, 461, 492, 494, 99/521–525, 537, 585, 586
See application file for complete search history.

(56) References Cited

U.S. PATENT DOCUMENTS 2,936,697 A * 5/1960 Kueser ................. A47J 37/0611
219/524
2004/0020371 A1* 2/2004 Patenotre ................ A47J 36/10
99/331
(Continued)

FOREIGN PATENT DOCUMENTS

| FR | 2790932 A1 | 9/2000 |
| GB | 2458897 A | 10/2009 |

OTHER PUBLICATIONS

European Search Report issued in corresponding European Patent Application No. 15173972.9 dated Dec. 8, 2015, 8 pages.

*Primary Examiner* — Phuong T Nguyen
(74) *Attorney, Agent, or Firm* — Pearne & Gordon LLP

(57) ABSTRACT

A cooking appliance comprising a base member, an upper member and a cooking chamber defined between the base member and the upper member, wherein the upper member is displaceable between a closed position, in which the upper member is closed on the base member and access to the cooking chamber is prevented, and an open position, in which access to the cooking chamber is permitted. The cooking appliance comprises a locking device displaceable from a locking condition, in which it prevents the upper member from being displaced from the closed position to the open position, and an unlocking condition in which it allows the upper member to be displaced from the closed position to the open position. The cooking appliance comprises an automatic actuating device for automatically taking the locking device in the unlocking condition upon a predetermined condition is reached, and a further manual actuating device for manually taking the locking device in the unlocking condition.

18 Claims, 8 Drawing Sheets

(56) References Cited

U.S. PATENT DOCUMENTS

2011/0132895 A1\* 6/2011 Tassan-Mangina ........................ A47J 37/0611
219/450.1
2012/0038256 A1\* 2/2012 Koelle ................. F16M 11/041
312/351.1

\* cited by examiner

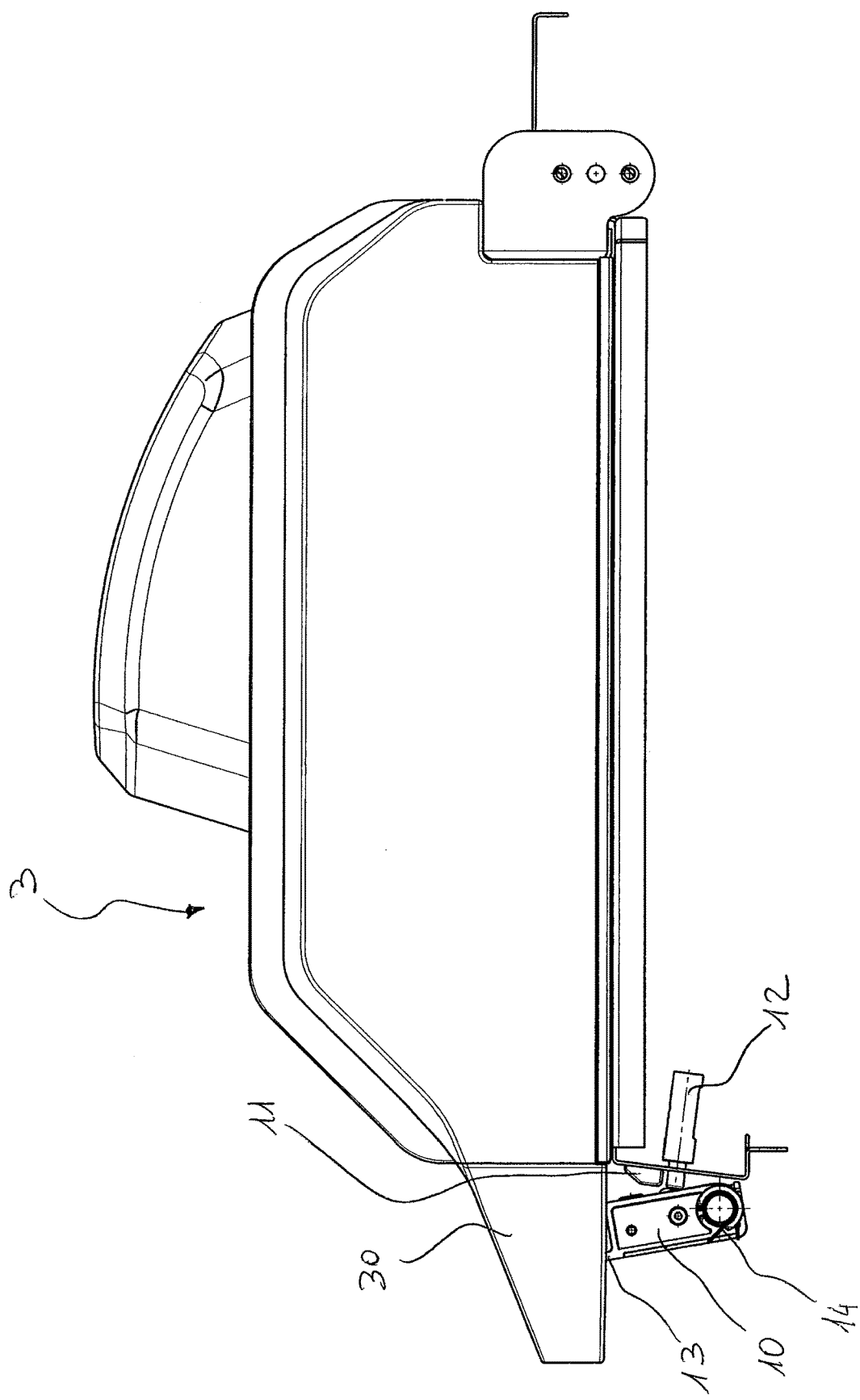

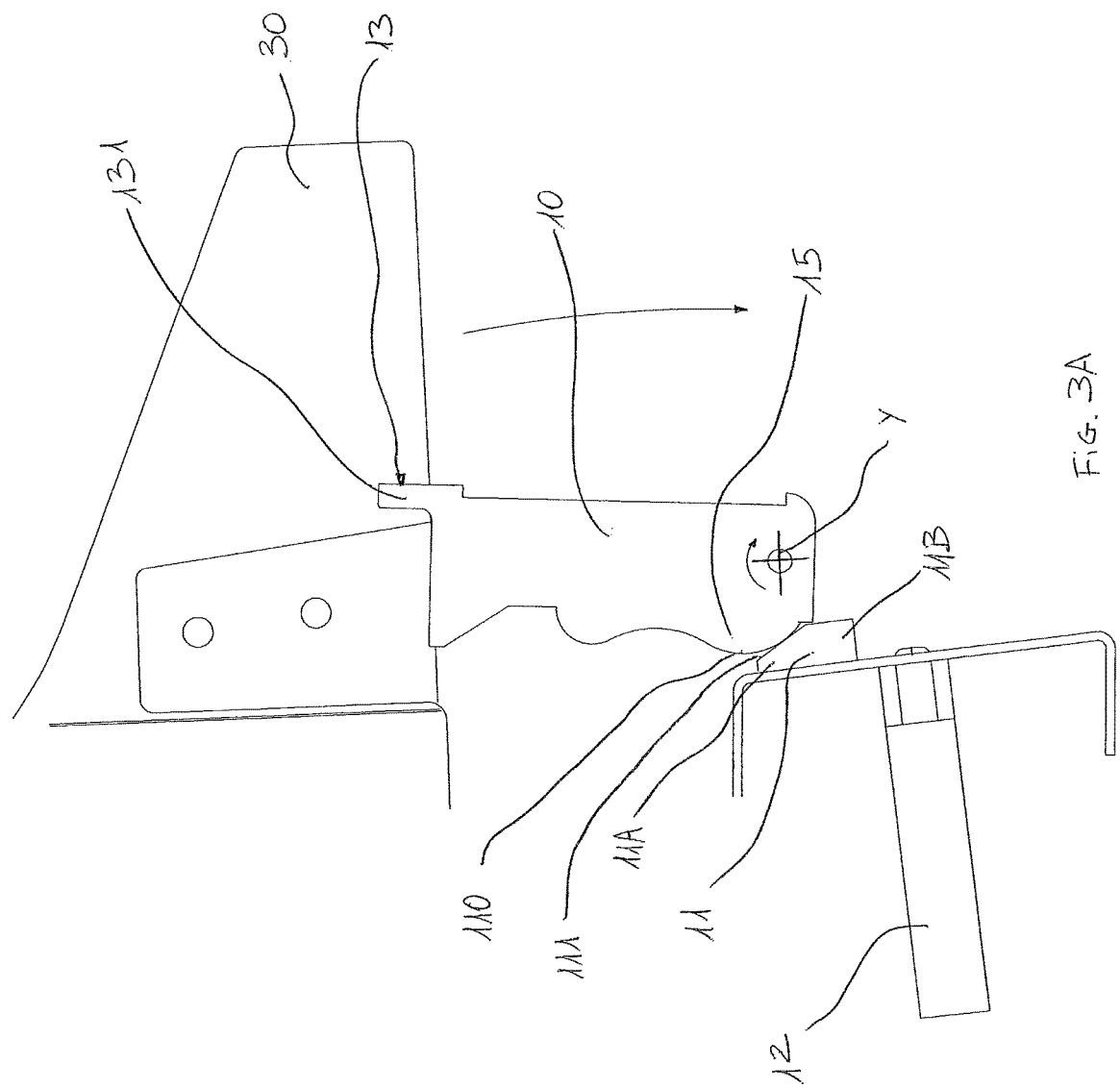

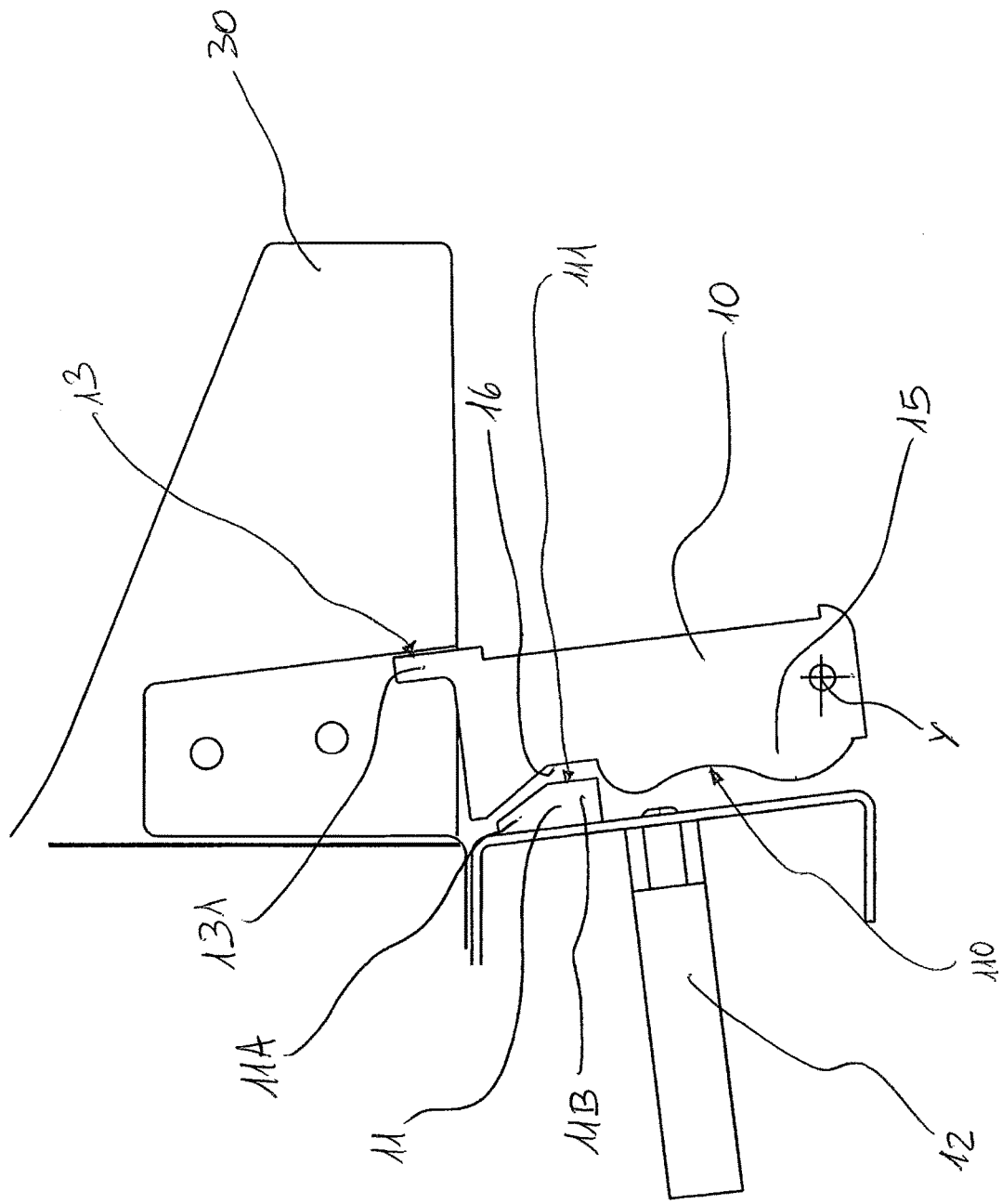

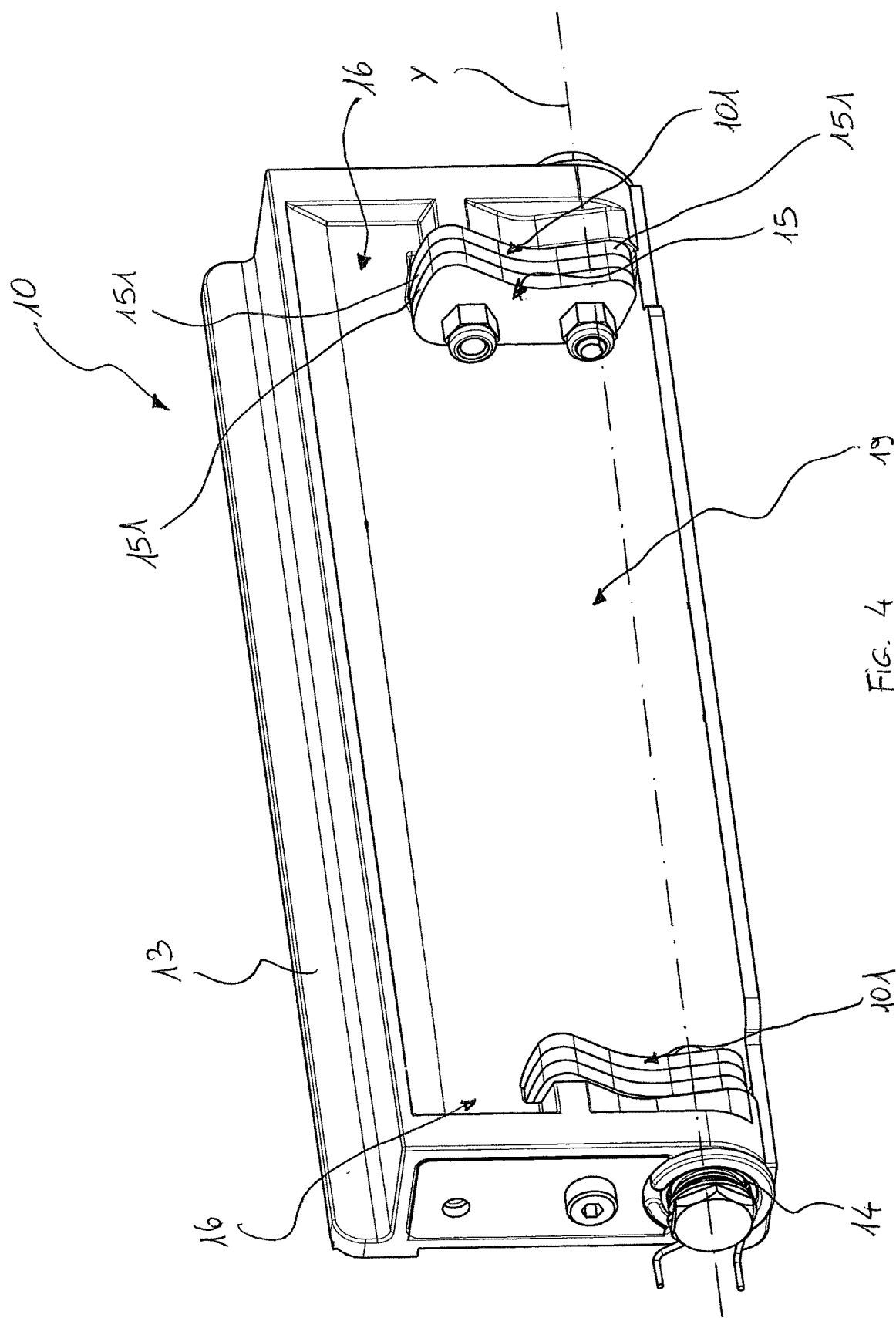

COOKING APPLIANCE

FIELD OF THE INVENTION

The present invention relates to a cooking appliance of the type including a base member, an upper member and a cooking chamber defined therebetween, in which access to the cooking chamber is alternatively prevented or permitted when the upper member is respectively closed on the base member or raised therefrom.

BACKGROUND OF THE INVENTION

Cooking apparatuses comprising a base member, an upper member, and a cooking chamber defined therebetween are well known in the art.

An example of such apparatus is disclosed in EP 1 714 595, filed by this same Applicant, relating to an apparatus for cooking food products on both sides thereof, comprising a base member associated to a bottom heating surface adapted to support food products to be cooked, an upper member associated to a top heating surface and joined in an articulated manner to the base member so that, when the upper member is displaced towards the base member, the top heating surface comes to lie opposite to the bottom heating surface so as to enclose the food products therebetween.

The upper member is adapted to close in onto the base member so as to form a cooking cavity containing said heating surfaces, the base member and/or the upper member comprising a microwave generator adapted to irradiate the food products being enclosed between said heating surfaces, wherein the cooking cavity defines a radiation shield capable of retaining the microwaves inside said cooking cavity itself.

It will be appreciated that an effective closure of the cooking chamber is required for containing microwaves and, in general, for having a proper cooking of the foodstuff.

SUMMARY OF THE INVENTION

The aim of the invention is to provide a cooking appliance comprising a base member, an upper member and a cooking chamber defined therebetween, in which the ergonomics is improved, ensuring at the same time a high safety of use.

Within this aim, a further object of the invention is allowing the upper member to be secured to/unfastened from the base member in an easy but reliable way. A further object is to provide a cooking appliance in which the upper member can be closed on the base member without requiring the use of both hands, or to perform complex operations with the finger of a hand.

Still another object of the invention is to provide a cooking apparatus in which the upper member can be quickly locked in its closed position on the base member.

Another object of the invention is to provide a cooking appliance in which closure of the upper member on the base member can be effectively controlled.

Also object of the invention is to provide a cooking appliance in the cover member can be opened also in the case of interruption of electric supply.

In addition, an object of the present invention is also to provide a cooking appliance in which the upper member can be unlocked in a reliable manner at the end of a cooking phase.

According to the invention it is provided a cooking appliance comprising:

a base member, upper member and a cooking chamber defined between the base member and the upper member, wherein the upper member is displaceable between a closed position in which the upper member is closed on the base member and access to the cooking chamber is prevented, and an open position in which access to the cooking chamber is permitted, a locking device displaceable from a locking condition, in which it prevents the upper member from being displaced from the closed position to the open position, and an unlocking condition in which it allows the upper member to be displaced from the closed position to the open position, wherein it comprises an automatic actuating device for automatically taking the locking device in the unlocking condition upon a predetermined condition is reached, and a further manual actuating device for manually taking the locking device in the unlocking condition.

The predetermined condition is advantageously a predetermined condition of the cooking appliance; this predetermined condition can be for example the condition of having reached the end of a cooking cycle, or the lapse of a certain time after the start of a cooking cycle or after the end of a cooking cycle, the reaching of a certain temperature within the cooking chamber, and so on.

The presence of the automatic actuating device has the advantageous effect of allowing an automatic opening of the upper member when a predetermined condition (for example when a cooking cycle is completed) is reached, which immediately informs the user that this condition has been reached; in addition the manual actuating device allows manually opening the upper member in case of need (e.g. in case of a lack of electric power) even if the predetermined condition has not been reached, which grants an higher freedom in the use of the appliance.

In a preferred embodiment, the locking device is arranged in such a way that it is automatically taken in the locking condition during a transition of the upper member from the open to the closed position.

The user is therefore only required to move the upper member from the opened to the closed position e.g. by lowering it, and accordingly only one hand is required therefor.

When the upper member is closed, only the actuating device or a manual operation on the grip portion can disengage the locking member, thus accidental opening of the upper member is prevented.

Furthermore, in the event of an interruption of power supply, the locking member remains in the closed position, since the urging device maintains it engaged with the engaging element.

Nevertheless, the manual actuating device allows disengaging the locking member, if required, even in case of interruption of power supply.

Preferably, the locking device comprises a locking member and an engaging element provided respectively on the base member and on the upper member or vice-versa, wherein in the locking condition the upper member is in the closed position and the engaging element engages the locking member so as to prevent the upper member from opening.

In this manner closure and locking of the upper member can be obtained with a reliable and robust solution, since the upper member is closed by means of a mechanical engagement between the locking member and the engaging element.

Preferably, the locking device comprises an urging device arranged for urging the locking member towards the engaging element.

This also contributes to make the closure and locking of the upper member more ergonomic, since the locking member is taken in locked condition without requiring the user to perform any further operation.

According to a preferred embodiment, the locking member and the engaging element comprise respective abutment surfaces arranged and shaped in such a way to abut one against the other during transition of the upper member from the open to the closed position and to cause the locking member to move away from the engaging element, and to cause the engagement of the locking member to the engaging element when the upper member reaches the closed position.

In this manner the movement of the upper member towards the closed position can be advantageously used for operating the locking member and achieving the locked condition.

According to another preferred embodiment of the invention, the abutment surface of the locking member is defined by a projection and a recess formed next thereto, the projection abutting the engaging element during transition of the upper member from the open to the closed position and the engaging element being at least partially housed in said recess in the closed position of the upper member.

This allows obtaining a shape coupling both for pushing the locking member away from the engaging element and for engaging the former on the latter, thus making the locking device reliable and robust.

Preferably, the cooking appliance comprises a control unit for controlling cooking cycles of the appliance and controlling the actuating device in order to unlock the upper member upon reaching the predetermined conditions.

The predetermined condition (for example the condition of having reached the end of a cooking cycle, or the lapse of a certain time after the start of a cooking cycle or after the end of a cooking cycle, the reaching of a certain temperature within the cooking chamber, and so on) at which the automatic actuating device is operated for automatically taking the locking device in the unlocking condition can be advantageously registered/set/memorized in the control unit or in a memory unit operatively connected to the latter.

The reaching of the predetermined condition can be advantageously communicated to the control by a suitable sensor, or by a timer, and so on.

Preferably, the cooking appliance comprises a sensor arranged for detecting the closed and/or open position of the upper member, the control unit being arranged for preventing or interrupting a cooking cycle if the sensor detects that the upper member is in the open position.

Or, in other words, the control unit advantageously allows operation of a cooking cycle only if the sensor detects that the upper member is in the closed position.

Also, according to a preferred embodiment, the cooking appliance further comprises at least one heating surface and a microwave generator, operation of the heating surface and of the microwave generator being controlled by the control unit.

In this manner it possible to automatically open the upper member after the end of a cooking cycle or step, which is particularly advantageous in case of mixed cooking both by contact heating and by microwaves.

Preferably, the upper member is hinged on the base member, the upper member being urged towards its open position when the locking member is disengaged.

Accordingly, access to the cooking chamber is permitted as the locking member is disengaged, thus allowing the user to remove food quickly from the cooking chamber.

According to a preferred embodiment, abutting surface of the engaging element is defined by a leading portion and a trailing portion thereof, the leading portion tapering towards the base member with respect to the trailing portion and being the one abutting first the locking member when the upper member is moved towards the closed position.

According to this aspect, the engagement of the locking member on the engaging element occurs gradually and smoothly.

According to another aspect of the invention, the grip portion is located behind a handle of the upper member.

This allows preventing accidental opening of the upper member and at the same time permits reaching of the grip portion when the hand of the user grasps the handle.

Accordingly the upper member can be also opened by using a single hand.

According to a preferred embodiment, the locking member is rotatably connected to the upper member, the abutment of the abutment surfaces causing rotation of the locking member and wherein the urging device urging in rotation the locking member towards the engaging member.

This allows to better control the forces required for unlocking the locking member and thus improving the reliability of the cooking appliance.

Preferably, the urging device comprises a helicoidal spring having axis parallel to an axis of rotation of the locking member, thus providing a reliable and compact embodiment for the urging device.

Also according to a preferred embodiment, the locking device comprises a guide element for the locking member, limiting the movement of the locking member away from the engaging element.

In this manner the position of the locking member can be precisely displaced between a first position in which it does not engage the engaging element and a second position in which the latter is engaged.

Preferably, the locking member is supported by supporting brackets projecting from upper member below the handle.

According to a preferred embodiment, the locking member is hinged on a distal end of the supporting brackets with respect to the handle.

These features also help improving the ergonomic and the compactness of the appliance.

According to another advantageous aspect of the invention, the guide element comprises a slot formed on at least one of the supporting brackets.

Accordingly, rotation of the locking member about the hinge axis can be controlled effectively.

According to a preferred embodiment, a cavity is defined in an internal side of the locking member, the internal side facing the base member when the upper member is in the closed position, at least one insert, forming the projection defining the abutment surface of the locking member, being supported in the cavity.

In this manner, different material can be used for the abutment surface and the other parts of the locking member, thus making it possible to use both material wear-resistant and materials easily moldable.

Preferably, the automatic actuating device is a linear actuator projecting from the base member so as to push the locking member away from the engaging element upon the occurrence of the predetermined conditions.

Anyway the automatic actuating device can be any kind of actuator, rotatable or linear, adapted to push the locking member away from the engaging element.

BRIEF DESCRIPTION OF THE DRAWINGS

These and other features and advantages of the invention will be better apparent from the following description of some exemplary and non-limitative embodiments, to be read with reference to the attached drawings, wherein:

FIGS. 2A and 2B are side views, the latter with parts removed for clarity, of the upper member of FIG. 1 in which a locking member is respectively engaged and disengaged with an engaging element;

FIGS. 3A-D are side views, showing the locking member during engagement on the engaging element, in an engagement condition, during disengagement from the engaging element and in a disengaged condition, respectively; and FIG. 4 is a perspective view of the locking member.

DETAILED DESCRIPTION OF THE INVENTION

Figure 1:
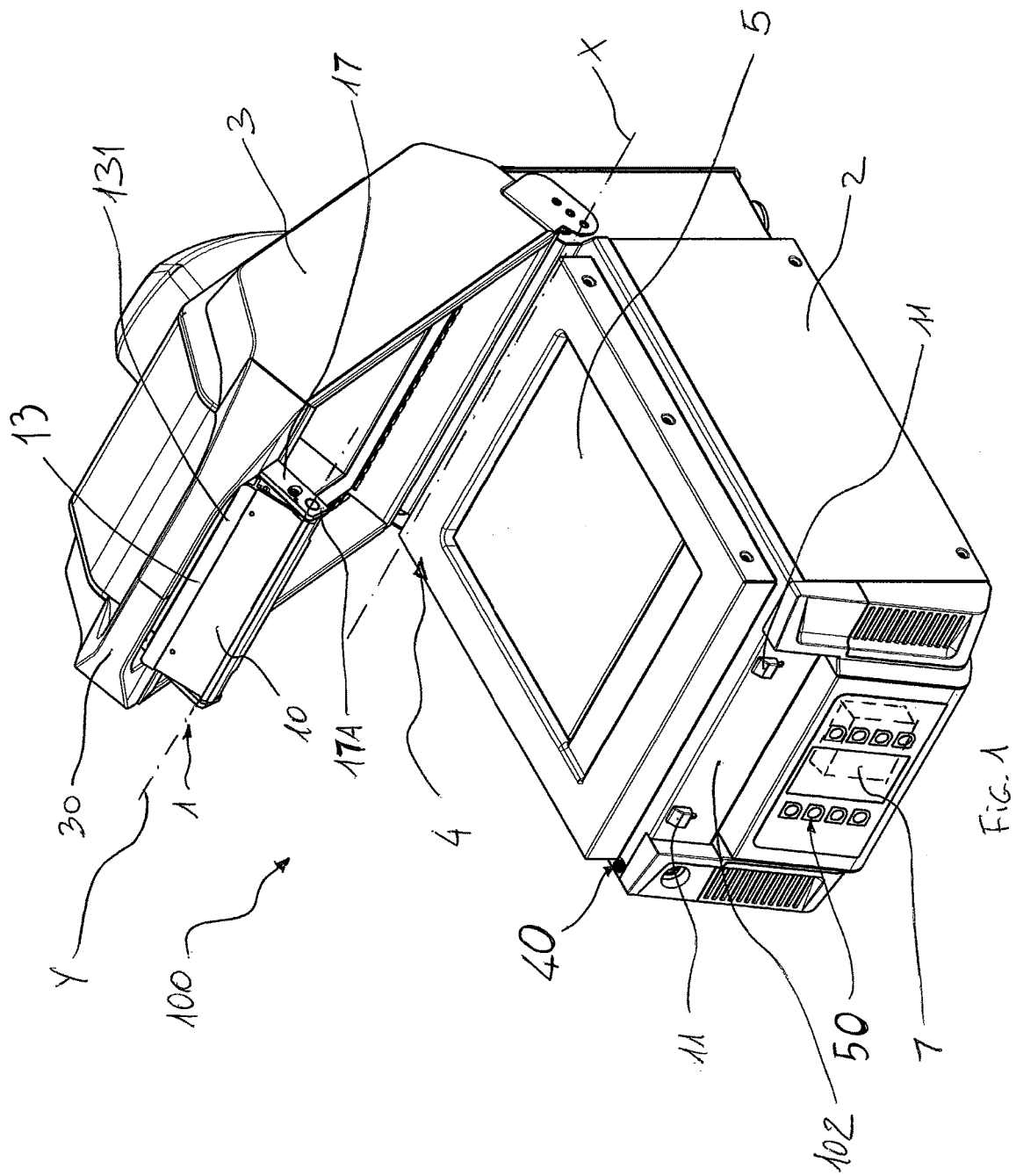
FIG. 1 is a perspective view of a cooking appliance according to the present invention with an upper member in an open position.

With reference initially to FIG. 1, a cooking appliance according to the invention is generally designated with the reference number 100. The appliance 100 comprises a base member 2 and an upper member 3 closable onto the base member 2. According to a preferred embodiment, the upper member 3 is movable relatively to the base member 2 from an open position as shown in FIG. 1 to a closed position (shown in FIGS. 2A and 2B) wherein the upper member 3 rests onto the base member.

A cooking chamber 4 is defined between the base member 2 and the upper member 3.

Access to the cooking chamber 4 is only permitted when the upper member 3 is in the open position, thus allowing the user to insert foodstuff to be cooked inside the cooking chamber 4.

When the upper member 3 is closed on the base member 2, access to the cooking chamber is prevented.

In the preferred embodiment illustrated in FIG. 1, the upper member 3 is hinged to the base member 2 about a rotation axis X, and it is provided with a handle 30, so that it can be manually rotated between the open position and the closed position. Preferably, the cooking appliance comprises a resilient element (e.g. a spring), not shown in the Figures, urging the upper member towards its open position. Accordingly, in a rest condition, i.e. a condition in which no forces are applied on the upper member 3, the cooking chamber 4 is open.

Preferably, the cooking appliance 100 comprises at least one heating surface 5 onto which the foodstuff can be cooked.

According to a preferred embodiment, the appliance 100 comprises at least one heater, not shown in the Figures, forming together with the heating surface 5 a cooking plate assembly capable of cooking the foodstuff by providing heat e.g. by direct contact.

According to preferred embodiment, both the upper member 3 and the base member 2 comprises a plate assembly, with a respective heating surface, only the one of the base member 2 being shown in the Figures.

Figure 2A:
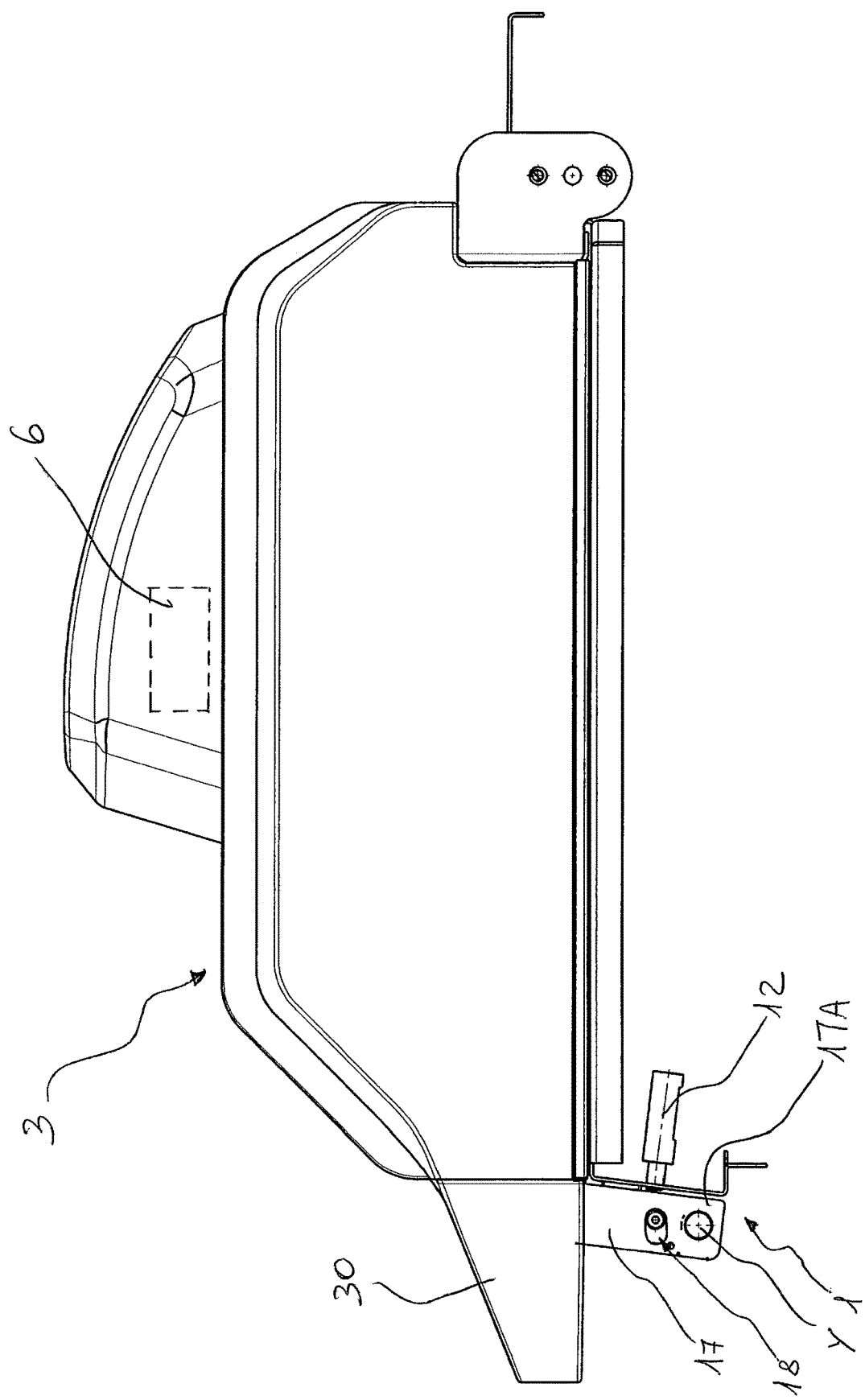

Preferably, the cooking appliance 100 further comprises a microwave generator 6, schematically shown in FIG. 2A, that can be contained in the upper member 3 and/or in the base member 3, and wave guides, not illustrated, for conducting microwaves into the cooking chamber 4.

With reference again to FIG. 1, according to a preferred embodiment, operation of the heating surface(s) 5 and of the microwave generator 6 is controlled by a control unit 7.

Advantageously the cooking appliance 100 comprises a sensor 40 (schematically illustrated in FIG. 1), for example a switch or an inductive or capacitive sensor, arranged for detecting the closed and/or open position of the upper member 3; the control unit 7 is preferably arranged for preventing or interrupting a cooking cycle if the sensor 40 detects that the upper member 3 is in the open position.

Preferably, the control unit 7 permits operation of the microwave generator 6 only if the upper member 3 is in the closed position. According to this embodiment, when the upper member 3 is closed on the base member 2, the cooking chamber 4 is closed so as to prevent propagation of microwaves generated by generator 6 outside the cooking chamber.

The cooking appliance of the present invention further comprises a locking device 1 for locking the upper member 3 in the closed position.

According to a preferred embodiment, the locking device 1 is displaceable from a locking condition, in which it prevents the upper member 3 from being displaced from the closed position to the open position, and an unlocking condition in which it allows the upper member 3 to be displaced from said closed position.

It will be therefore appreciated that, since in the present embodiment cooking appliance comprises a resilient element urging the upper member 3 towards its open position, when the locking device 1 is in the unlocking condition the upper member will be automatically moved to the open position, thus permitting access to the cooking chamber 4.

With reference now also to FIGS. 3A-D, the locking device 1 preferably comprises a locking member 10 and an engaging element 11 formed, in the present embodiment, on the base member 2 and on the upper member 3, respectively.

In the locking condition of the locking device, with the upper member 3 in the closed position, the engaging element 11 engages the locking member 10, so as to prevent the upper member (3) from being displaced to the open position.

According to a preferred embodiment, the cooking appliance 100 comprises two distinct engaging elements 11 positioned on a front wall 102 of the base member 2. Always preferably, the locking member 10 is provided below the handle 30 of the upper member 3, as will be described in further detail in the following.

As shown in FIG. 3B, in which the upper member 3 is represented locked in the closed position, according to a preferred embodiment respective abutment surfaces 110 and 111 of the locking member 10 and of the engaging element 11, respectively, engages each other in order to avoid unlocking of the locking device.

Preferably, the abutment surfaces engages at a recess 16 formed in the locking member 10, in which the engaging element 11 is at least partially housed when the locking device 1 is locked. It will be apparent that in order to lift the upper member 3 towards the open position, the locking member 10 should be moved away from the engaging element 11, thus removing the latter from the recess 16.

To this purpose the locking member 10 is capable of being displaced towards and away from the engaging element 11, as will be described in further detail in the following.

According to a preferred embodiment, the locking device 1 also comprises a guide element 18 for the locking member 10, limiting the movement of the locking member 10 away from the engaging element 11.

In order to keep the locking member in the locked position, i.e. the position in which the locking member 10 is engaged with the engaging element 11, the locking device 1 further comprises an urging device 14, e.g. a coil, shown in FIGS. 2B and 4, for urging the locking member 10 towards the engaging element 11.

Figure 3C:
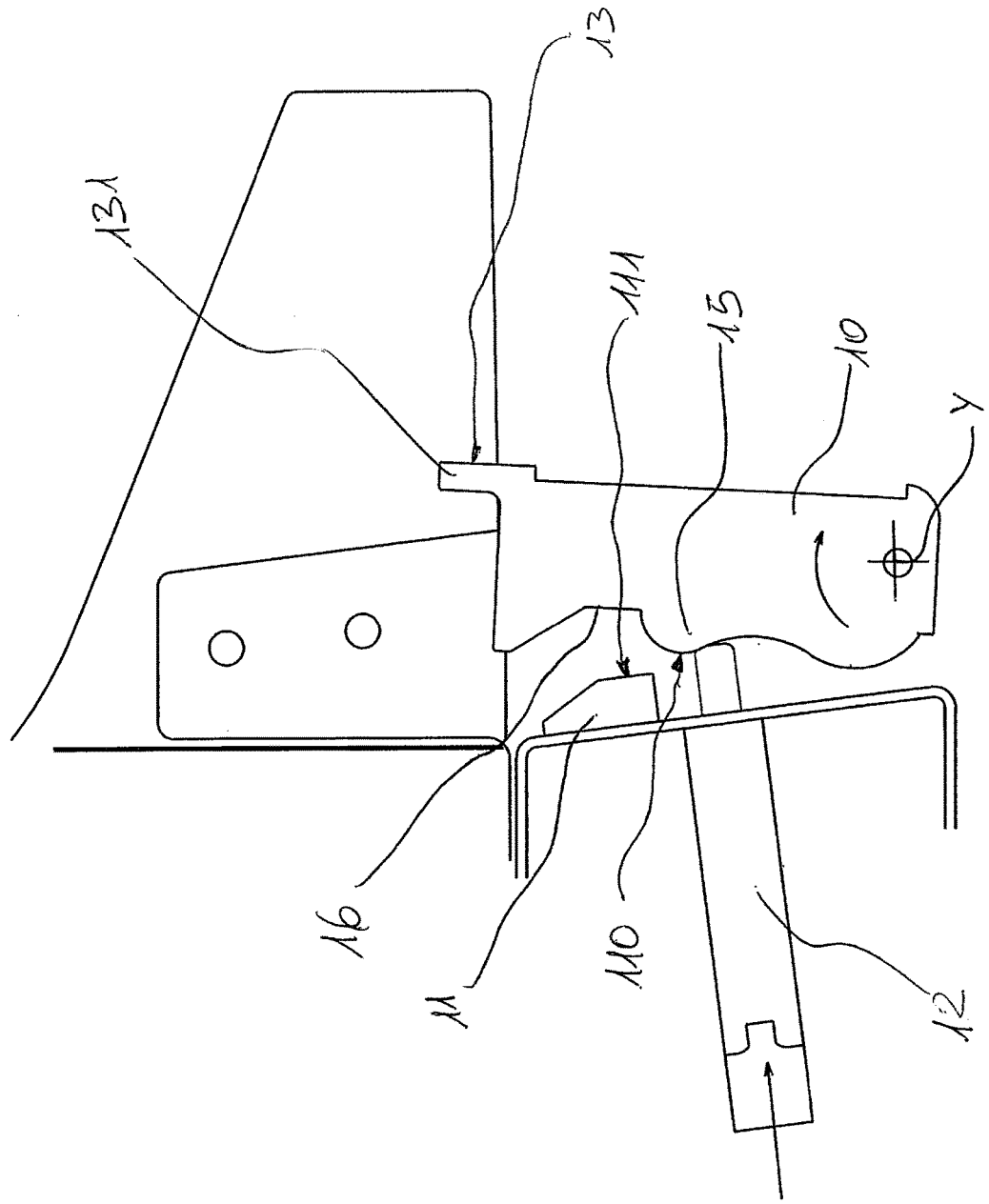
Figure 3D:
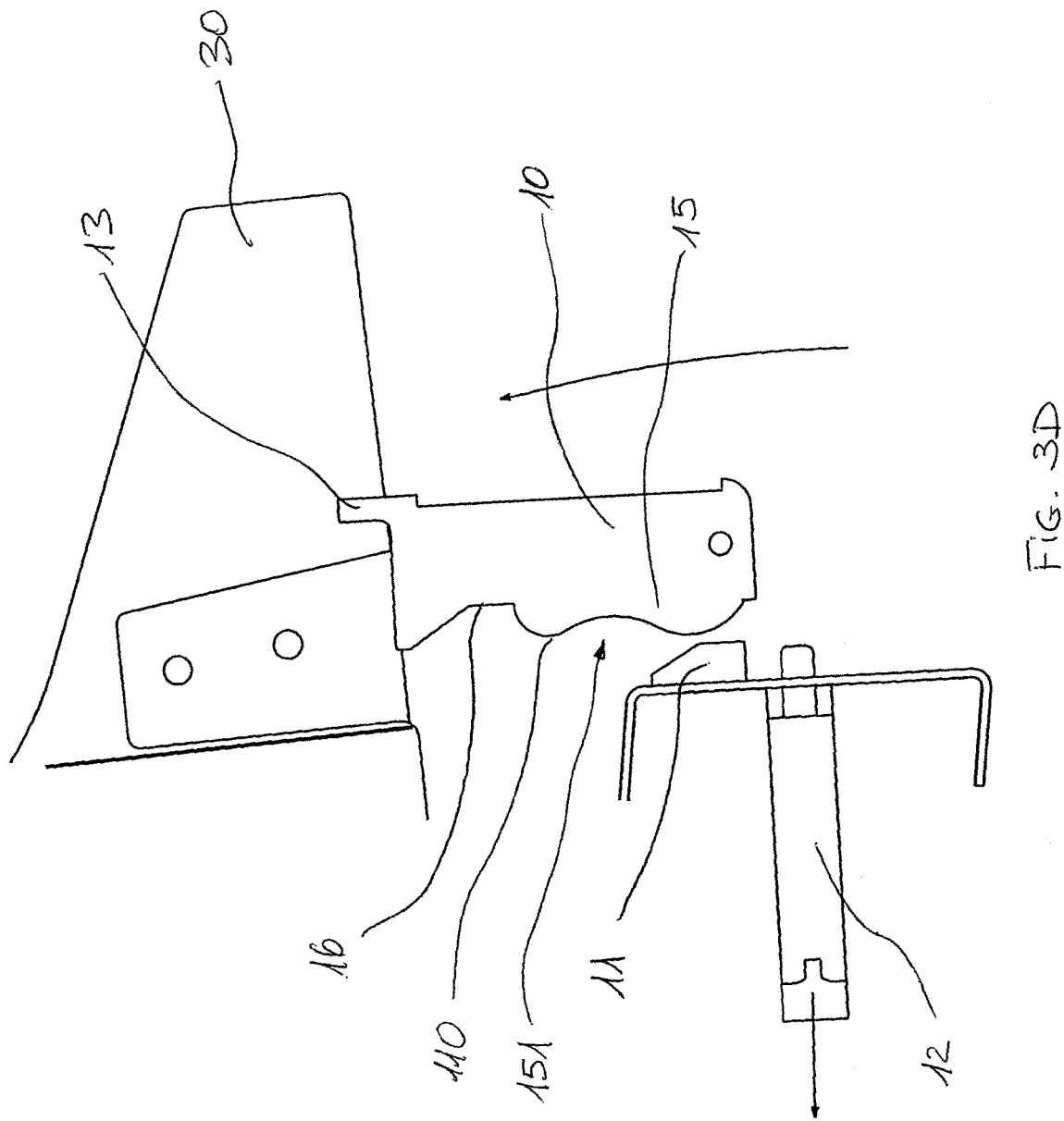

With reference now to FIG. 3A-D, the abutment surfaces 110 of the locking member 10 and the abutment surface 111 of the engaging element 11 are also shaped such that the locking member 10 abuts against the engaging element 11 during transition of the upper member 3 from the open to the closed position, as shown in FIG. 3A.

As previously explained, the locking member 10 can be displaced in order to be engaged to/disengaged from the engaging element 11. Accordingly, as the abutment surfaces 110 of the locking member 10 abuts the abutment surface 111 of the engaging element 11 during the above explained transition movement of the upper member 3, the locking member 10 is moved away from the engaging element 11.

Nevertheless, the abutment surface is shaped such that when the closed position of the upper member 3 is reached, the locking member 10 engages the engaging element 11 urged by the urging device 14, i.e. in the present embodiment, the engaging element 11 enters the recess 16, locking the upper member 3 as previously explained.

In any case, also different embodiments can be envisaged for the locking device 1, provided that it is arranged in such a way that it is automatically taken in said locking condition during the transition of the upper member 3 from the open to the closed position.

According to a preferred embodiment, the abutment surface 110 of the locking member 10 is defined by a projection 15 suitably shaped and by the recess 16. Preferably, the recess 16 is formed next to the projection 15 so that, when the upper member 3 is moved from the open to the closed position, the engaging element 11 first abut the surface 111 of the projection 15 and, as the upper member 3 reaches the closed position, enters the recess 16. Preferably, the projection 15 also comprises an intermediate recess 151, shown in FIG. 3D, for obtaining a smoother contact between the engaging element 11 and the locking member 10 during transition to the closed position of the upper member 3.

According to a preferred embodiment, the abutting surface 111 of the engaging element 11 is defined by a leading portion 11A and a trailing portion 11B. The leading portion 11A abuts first the locking member 10 when the upper member 3 is moved towards the closed position. Preferably, the leading portion 11A tapers towards the base member 2 with respect to the trailing portion 11B so as to gradually displace the locking member 10.

It will be anyhow apparent that other shapes of the locking member 10 and/or of the engaging element 11 suitable for first moving away the locking member 10 and, as the closed position is reached, obtaining an engagement between the engaging element 11 and the locking member 10 can be envisaged.

It will be also appreciated that, according to a preferred embodiment, the locking member 10 is rotatably connected to the upper member 3 and the abutment of the abutment surfaces 110 and 111 causes rotation of the locking member 10. In this embodiment, the urging device 14 urges in rotation the locking member 10 towards the engaging member 11. In this case, preferably, the urging device 14 comprises a helicoidal spring, shown in FIG. 4, having axis parallel to the axis of rotation Y of the locking member 10. According to a preferred embodiment such axis of rotation Y is parallel to the hinge axis X of the upper member 3.

Also, as shown in FIG. 1, according to a preferred embodiment, the locking member 10 is supported by supporting brackets 17 projecting below the handle 30, preferably hinged on a distal end 17A thereof. According to this aspect of the invention, the guide element 18 comprises a slot formed on at least one of the supporting brackets 17.

With reference again to FIG. 4, according to a preferred embodiment, a cavity 19 is defined in an internal side of the locking member 10, i.e. on the side facing the base member 2 when the upper member 3 is in the closed position.

Preferably, the projection 15 defining the abutment surface 110 of the locking member 10 is formed by at least one insert 151, three in the present embodiment, which is supported on the cavity 19.

With reference again to FIGS. 2A-B and 3A-D, the cooking appliance 100 further comprises an automatic actuating device 12 automatically taking the locking device 1 in the unlocking condition upon a predetermined condition is reached. Accordingly, the locking member 10 can be unlocked by the operation of the automatic actuating device 12. Preferably, the automatic actuating device 12 is a linear actuator projecting from the base member 2 so as to push the locking member 10 away from the engaging element 11.

Anyway the automatic actuating device 12 can be any kind of actuating device arranged in such a way to be able to push the locking member 10 away from the engaging element 11 According to a preferred embodiment, the actuating device 12 is also controlled by the control unit 7 so as to disengage the locking member automatically upon predetermined conditions, such as the end of a cooking cycle. Preferably, the actuator is pulled back in its rest position, i.e. the position shown in FIGS. 3A and 3B, after the locking device has been unlocked. This can be either controlled by the control unit 7 or can be achieved automatically by using a suitable actuating device 12, such as a wax motor.

The cooking appliance 100 of the invention further comprises a further manual actuating device 13 for manually taking the locking device 1 in the unlocking condition.

Preferably, manual actuating device 13 comprises a grip portion 131 formed on the locking member 10 for manually disengaging it from the engaging element 11.

Preferably, the manual actuating device 13 is located behind the handle 30 of the upper member 3, so that it can be easily reached by the finger of the user while he grasps the handle 30.

In the following, operation of the cooking appliance according to the present invention will be described.

When the cooking appliance is in rest condition, as previously explained, the upper member 3 is open and access to the cooking chamber 4 is permitted.

Accordingly, the user can insert in the cooking chamber 4 any foodstuff to be cooked.

Next, the user closes the upper member 3 on the base member 2, thus locking the former by means of the locking device 1.

By means of a selecting device, not shown, such as a push button 50, the user selects a cooking cycle. The control unit 7 starts the selected cooking cycle provided that closure of the upper member 3 is confirmed by the sensor 40.

When the cooking cycle ends, the automatic actuating device, 12 controlled by the control unit 7, unlocks the locking device 1 and the upper member 3 is urged in the open position.

In this manner the user can easily realize that the cooking cycle has finished and foodstuff can be promptly removed from the cooking chamber 4.

After the locking device 1 has been unlocked, the automatic actuating device 12 is pulled back in its rest position, as previously explained, in order to allow locking the locking device 1 in case the upper member 3 is closed again.

The upper member 3 can be open also in emergency situation or in cases of interruption of power supply by using the manual actuating device 13.

In case of opening of the upper member 3 during a cooking cycle, the control unit 7 advantageously interrupts the cooking cycle as soon as the sensor 40 detects the open position of the upper member 3.

It will be therefore appreciated that the movement required for disengaging the locking member 10, i.e. the rotation about axis Y in the present embodiment, can be both obtained automatically by means of the automatic actuating device 12 (e.g. when a prefixed cooking time has lapsed) and manually by acting on the manual actuating device 13.

Furthermore, only one end is required in order to close the upper member 3, since the engagement between the locking member 10 and the engaging element 11, i.e. the locking of the upper member 3, occurs automatically as it reaches the closed position.

The invention claimed is:

1. A cooking appliance comprising:
    a base member, an upper member and a cooking chamber defined between the base member and the upper member, wherein the upper member is displaceable between a closed position, in which the upper member is closed on the base member and access to the cooking chamber is prevented, and an open position, in which access to the cooking chamber is permitted;
    a locking member rotatably coupled to the upper member;
    an engaging element coupled to the base member;
    an urging member configured to urge in rotation the locking member towards the engaging element,
    wherein the locking member and the engaging element comprise respective abutment surfaces such that abutment of the abutment surfaces causes a rotation of the locking member.

2. The cooking appliance according to claim 1, wherein said locking member is arranged in such a way that it is automatically taken into a locking condition during a transition of the upper member from said open position to said closed position.

3. The cooking appliance according to claim 1, wherein in a locking condition said upper member is in said closed position and said engaging element engages said locking member, so as to prevent the upper member from being displaced to said open position.

4. The cooking appliance according to claim 1, wherein said abutment surfaces arranged and shaped in such a way to abut one against the other during transition of the upper member from said open position to said closed position, and to cause said locking member to move away from said engaging element in a first part of said transition, and to cause the engagement of said locking member to said engaging element when the upper member reaches said closed position.

5. The cooking appliance according to claim 1, wherein said abutment surface of said locking member is defined by a projection and a recess formed next thereto, said projection abutting the engaging element during transition of the upper member from the open position to the closed position, and said engaging element being at least partially housed in said recess in said closed position of the upper member.

6. The cooking appliance according to claim 1, further comprising a control unit arranged for controlling cooking cycles of the appliance and for taking the appliance into said unlocking condition upon reaching said predetermined condition.

7. The cooking appliance according to claim 1, further comprising a sensor arranged for detecting the closed or open position of the upper member, and a control unit being arranged for preventing or interrupting a cooking cycle if the sensor detects that the upper member is in said open position.

8. The cooking appliance according to claim 1, further comprising at least one heating surface and a microwave generator, operation of said heating surface and of said microwave generator being controlled by a control unit.

9. The cooking appliance according to claim 1, wherein the upper member is hinged on the base member, the upper member being urged towards its open position when the appliance is in said unlocking condition.

10. The cooking appliance according to claim 1, wherein the abutment surface of the engaging element is defined by a leading portion and a trailing portion thereof, the leading portion tapering towards the base member with respect to the trailing portion and abutting first the locking member when the upper member is moved towards said closed position.

11. The cooking appliance of claim 1 further comprising an actuating device projecting linearly from the base member and configured to push the locking member away from the engaging element.

12. The cooking appliance of claim 11 further comprising a control unit configured to control the actuating device so as to disengage the locking member automatically upon an end of a cooking cycle.

13. The cooking appliance of claim 11 further comprising a control unit configured to control the actuating device so as to disengage the locking member automatically upon an end of a cooking cycle.

14. The cooking appliance of claim 1 further comprising a manual actuating device for manually taking the appliance into an unlocking condition.

15. The cooking appliance according to claim 14, wherein said manual actuating device comprises a grip portion of said locking member located behind a handle of said upper member.

16. The cooking appliance according to claim 1, further comprising a guide element for the locking member, limiting a movement of the locking member away from or toward to the engaging element.

17. The cooking appliance according to claim 1, wherein the locking member is supported by supporting brackets projecting from said upper member below a handle of said upper member.

18. A cooking appliance comprising:
    a base member, an upper member and a cooking chamber defined between the base member and the upper member, wherein the upper member is displaceable between a closed position, in which the upper member is closed on the base member and access to the cooking chamber is prevented, and an open position, in which access to the cooking chamber is permitted,
    a locking device displaceable from a locking condition, in which it prevents said upper member from being displaced from said closed position to said open position, and an unlocking condition in which it allows said upper member to be displaced from said closed position to said open position,
    an automatic actuating device for automatically taking said locking device into said unlocking condition when a predetermined condition is reached, and a further manual actuating device for manually taking said locking device into said unlocking condition, wherein said locking device comprises a locking member and an engaging element provided respectively on the base member and on the upper member, or vice-versa, wherein in said locking condition said upper member is in said closed position and said engaging element engages said locking member, so as to prevent the upper member from being displaced to said open position, wherein said locking member and said engaging element comprise respective abutment surfaces arranged and shaped in such a way to abut one against the other during transition of the upper member from said open to said closed position, and to cause said locking member to move away from said engaging element in a first part of said transition, and to cause the engagement of said locking member to said engaging element when the upper member reaches said closed position, wherein the locking member is rotatably connected to the upper member, the abutment of the abutment surfaces causing a rotation of the locking member, the urging device urging in rotation the locking member towards the engaging element.

* * * * *